(12) United States Patent
Pinault et al.

(10) Patent No.: US 8,986,837 B2
(45) Date of Patent: Mar. 24, 2015

(54) PREPARATION OF PRECIPITATED SILICA FROM SODIUM METABISULFITE OR SODIUM SULFITE

(75) Inventors: Anne-Laure Pinault, Antony (FR); Joël Racinoux, Rochetaillée sur Saône (FR); Petro Pechkurov, Kiev (UA)

(73) Assignee: Rhodia Operations, Aubervilliers (FR)

( * ) Notice: Subject to any disclaimer, the term of this patent is extended or adjusted under 35 U.S.C. 154(b) by 1088 days.

(21) Appl. No.: 13/001,682

(22) PCT Filed: Jul. 3, 2009

(86) PCT No.: PCT/EP2009/058440
§ 371 (c)(1),
(2), (4) Date: Sep. 2, 2011

(87) PCT Pub. No.: WO2010/000847
PCT Pub. Date: Jan. 7, 2010

(65) Prior Publication Data
US 2012/0094125 A1  Apr. 19, 2012

(30) Foreign Application Priority Data
Jul. 4, 2008 (FR) .................................. 08 03810

(51) Int. Cl.
*B32B 5/16* (2006.01)
*C01B 33/193* (2006.01)

(52) U.S. Cl.
CPC .......... *C01B 33/193* (2013.01); *Y10T 428/2982* (2013.01)
USPC ............ 428/402; 428/404; 423/335; 423/339

(58) Field of Classification Search
USPC ........................... 428/402, 404; 423/335, 339
See application file for complete search history.

(56) References Cited

FOREIGN PATENT DOCUMENTS

| DE | 3938730 A1 | 5/1991 |
|---|---|---|
| WO | WO2006/131066 | * 12/2006 |
| WO | WO 2006/131066 A1 | 12/2006 |

OTHER PUBLICATIONS

International Search Report corresponding to PCT/EP 2009/058440 mailed Sep. 17, 2009.

* cited by examiner

*Primary Examiner* — Leszek Kiliman
(74) *Attorney, Agent, or Firm* — Dentons US LLP

(57) ABSTRACT

A method for preparing precipitated silica includes the reaction of sodium metabisulfite or sodium sulfite with sand, wherein a) sand is mixed with sodium metabisulfite or sodium sulfite; b) the mixture thus obtained is melted to produce solid sodium silicate and sulfurous anhydride; c) the solid sodium silicate is dissolved in water to provide a sodium silicate aqueous solution, d) the sulfurous anhydride is reacted with the sodium silicate aqueous solution to provide a mixture containing precipitated silica; and e) the precipitated silica is separated from said mixture.

12 Claims, No Drawings

PREPARATION OF PRECIPITATED SILICA FROM SODIUM METABISULFITE OR SODIUM SULFITE

CROSS-REFERENCE TO PRIOR APPLICATIONS

This application claims priority under 35 U.S.C. §119 of FR 0803810, filed Jul. 4, 2008, and is the U.S. National Stage of PCT/EP 2009/058440, filed Jul. 3, 2009 and designating the United States (published in the French language on Jan. 7, 2010, as WO 2010/000847 A1; the title and abstract were also published in English), each hereby expressly incorporated by reference in its entirety and each assigned to the assignee hereof.

The present invention relates to the use of sodium metabisulfite or sodium sulfite for producing precipitated silica.

The invention relates in particular to a process for preparing precipitated silica using as starting material, on the one hand, sand, and, on the other hand, sodium metabisulfite ($Na_2S_2O_5$) or sodium sulfite ($Na_2SO_3$).

Precipitated silica may be used in various fields.

It is thus known practice to use precipitated silica as a reinforcing white filler in polymers or elastomers (for example diene elastomers), especially in finished articles such as shoe soles, tires, floor coverings, flame-retardant materials, technical components such as ropeway rollers, seals, linings, transmission belts and cables, generally in combination with a coupling agent.

It may also be used as an active material absorber; it may be used as a support for liquids, for example used in food, such as vitamins (vitamin E) or choline chloride.

It is also used as a catalyst support, as a viscosity modifier, texturizer or anticaking agent, as a separating component for batteries, as a toothpaste, paint or paper additive, or as an insulating material.

The known processes for preparing precipitated silica are generally performed by precipitation reaction of a sodium silicate with sulfuric acid, with production of a suspension of precipitated silica, followed by separation, in particular by filtration (with production of a filter cake, which may then be washed and/or disintegrated), of the precipitated silica obtained, and finally drying.

The sodium silicate used in these processes is obtained beforehand by reacting sand with large amounts of sodium carbonate (resulting in high cost), or with sodium sulfate, requiring the presence of a reducing agent such as carbon.

The aim of the present invention is to propose an alternative to the known processes for preparing precipitated silica from sand (quartz sand), which does not require the use of sodium carbonate, sodium sulfate, sulfuric acid, $CO_2$ and a reducing agent, such as carbon, to obtain the intermediate sodium silicate.

Thus, the invention consists firstly in using sodium metabisulfite or sodium sulfite to produce precipitated silica, according to the reaction scheme (R)((R)=(1)+(2)+preferably (3)) or the reaction scheme (R')((R')=(1')+(2')) below:

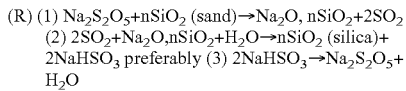

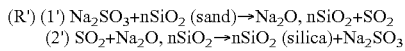

Preferably, in reaction scheme (R), reaction (3) is performed (in particular by supplying heat (drying/condensation, according to an evaporation-crystallization type mechanism) and the sodium metabisulfite ($Na_2S_2O_5$) obtained in this reaction (3) is used as starting material in reaction (1), i.e. it is (at least partly, and generally totally) recycled into/reused for reaction (1).

Similarly, in reaction scheme (R'), preferably, the sodium sulfite ($Na_2SO_3$) obtained in reaction (2') is used as starting material in reaction (1'), i.e. it is (at least partly, and generally totally) recycled into/reused for reaction (1').

The use of sodium metabisulfite (reaction scheme (R)) is the preferred variant of the invention.

The invention also proposes a process for preparing precipitated silica from sand (quartz sand) and sodium metabisulfite, characterized in that it comprises the following steps:

a) sand and sodium metabisulfite are mixed together, preferably in the following mass proportions: 40 to 60% and in particular 44 to 57% of sand, and 60 to 40% and in particular 56 to 43% of sodium metabisulfite;

b) the mixture obtained is brought to a temperature of between 1200 and 1600° C. (to melting) and in particular between 1300 and 1500° C., for example in air or in nitrogen, especially in an oven, to produce solid (vitreous) sodium silicate and sulfur dioxide $SO_2$;

c) said solid sodium silicate is then dissolved (solubilized) in water, especially in a weight proportion of 10 to 40%, for example 12 to 36%, of silicate per 90 to 60% and in particular 88 to 64% of water, in particular at a temperature above 150° C. and, for example, for at least 20 minutes, so as to obtain, optionally after filtration, an aqueous sodium silicate solution;

d) sulfur dioxide $SO_2$, advantageously the sulfur dioxide $SO_2$ obtained in step b), is reacted with said aqueous sodium silicate solution, optionally in the additional presence of water (especially according to the mode and/or the concentrations desired for precipitation of the silica), the reaction preferably being performed at a temperature of between 60 and 100° C., and, for example, for 15 to 180 minutes, so as to obtain a mixture containing precipitated silica and sodium hydrogen sulfite $NaHSO_3$ (in the mother liquors);

e) the precipitated silica is separated from the sodium hydrogen sulfite, especially by filtration.

The sulfur dioxide obtained in step b) is advantageously used in step d), especially in gaseous form or as a solution. Thus, before its use in step d), it may have been separated from the fumes obtained during step b), and then optionally liquefied; or it may have been absorbed into water (in which case an aqueous solution prepared by absorption of the sulfur dioxide contained in the fumes obtained during step b) is used in step d)).

In general, in step e), the mixture obtained in step d) is subjected to filtration, and:

the resulting filter cake is, optionally after acidification (for example to a pH value of the cake of between 3 and 6.5), which may be followed by a (another) filtration, washed (especially with water) and dried, to obtain a precipitated silica;

preferably, the filtrate, containing the sodium hydrogen sulfite, is dried (by any known means), to obtain (in particular by condensation of the sodium hydrogen sulfite, according to an evaporation-crystallization type mechanism) sodium metabisulfite, which is recycled into step a).

Advantageously, sodium metabisulfite is thus produced and used as starting material for preparing the solid sodium silicate (recycling).

This process according to the invention, which is preferably performed continuously, is simple and allows a decrease in cost and a reduction, or even absence, of discharge into the environment.

The invention also proposes a process for preparing precipitated silica from sand (quartz sand) and sodium sulfite, characterized in that it comprises the following steps:

a) sand and sodium sulfite are mixed together, preferably in the following mass proportions: 50 to 70% and in particular 54 to 66% of sand, and 50 to 30% and in particular 46 to 34% by weight of sodium sulfite;

b) the mixture obtained is brought to a temperature of between 1200 and 1600° C. (to melting) and in particular between 1300 and 1500° C., for example in air or in nitrogen, especially in an oven, to produce solid (vitreous) sodium silicate and sulfur dioxide $SO_2$;

c) said solid sodium silicate is then dissolved (solubilized) in water, especially in a weight proportion of 10 to 40%, for example 12 to 36%, of silicate per 90 to 60% and in particular 88 to 64% of water, in particular at a temperature above 150° C. and, for example, for at least 20 minutes, so as to obtain, optionally after filtration, an aqueous sodium silicate solution;

d) sulfur dioxide $SO_2$, advantageously the sulfur dioxide $SO_2$ obtained in step b), is reacted with said aqueous sodium silicate solution, optionally in the additional presence of water (especially according to the mode and/or the concentrations desired for precipitation of the silica), the reaction preferably being performed at a temperature of between 60 and 100° C., and, for example, for 15 to 180 minutes, so as to obtain a mixture containing precipitated silica and sodium sulfite; in general, the reaction (precipitation) is stopped when the pH of the reaction medium reaches a value of between 8.0 and 8.2;

e) the precipitated silica is separated from the sodium sulfite, especially by filtration.

The sulfur dioxide obtained in step b) is advantageously used in step d), especially in gaseous form or as a solution. Thus, before its use in step d), it may have been separated from the fumes obtained during step b) and then optionally liquefied; or it may have been absorbed into water (in which case an aqueous solution prepared by absorption of the sulfur dioxide contained in the fumes obtained during step b) is used in step d)).

In general, in step e), the mixture obtained in step d) is subjected to filtration, and:

the resulting filter cake is, optionally after acidification (for example to a pH value of the cake of between 3 and 6.5), which may be followed by a (another) filtration, washed (especially with water) and dried, to obtain a precipitated silica;

preferably, the filtrate, containing the sodium sulfite, is, optionally after drying (by any known means), recycled into step a).

Advantageously, sodium sulfite produced during the process is used as starting material for preparing the solid sodium silicate (recycling).

This process according to the invention, which is preferably performed continuously, is simple and allows a decrease in cost and a reduction, or even absence, of discharge into the environment.

The separation performed in the processes of the invention (step e)) usually comprises a filtration, followed by washing, if necessary.

In the invention, the filtration(s) is (are) performed according to any suitable method, for example by means of a filter press, a band filter or a vacuum filter.

The drying of the filter cake may be performed according to any means known per se.

Preferably, the drying is performed by atomization. To this end, any type of suitable atomizer may be used, especially a rotary, nozzle, liquid-pressure or two-fluid atomizer. In general, when the filtration is performed using a filter press, a nozzle atomizer is used, and when the filtration is performed using a vacuum filter, a rotary atomizer is used.

It should be noted that the filter cake is not always under conditions that allow atomization, especially on account of its high viscosity. In a manner known per se, the cake is then subjected to a disintegration operation. This operation may be performed mechanically, by placing the cake in a mill of colloidal or ball type. The disintegration is generally performed in the presence of an aluminum compound, in particular sodium aluminate, and, optionally, in the presence of a small amount of acidifying agent (in the latter case, the aluminum compound and the acidifying agent are generally added simultaneously). The disintegration operation especially makes it possible to lower the viscosity of the product that is to be subsequently dried.

When the drying is performed using a nozzle atomizer, the silica that may then be obtained is usually in the form of substantially spherical beads.

After drying, a milling step may then be performed on the recovered product. The silica that may then be obtained is generally in the form of a powder.

When the drying is performed using a rotary atomizer, the silica that may then be obtained may be in the form of a powder.

Finally, the product dried (especially with a rotary atomizer) or ground as indicated previously may optionally be subjected to an aggregation step, which consists, for example, of direct compression, wet granulation (i.e. with the use of a binder such as water, a silica suspension, etc.), extrusion or, preferably, dry compacting. When the latter technique is performed, it may prove suitable, before performing the compacting, to deaerate (operation also known as predensification or degassing) the pulverulent products so as to remove the air included therein and to ensure more uniform compacting.

The silica that may then be obtained via this aggregation step is generally in the form of granules.

The silica powders, and similarly beads, obtained by the invention make it possible, inter alia, to gain easy access to granules, especially by means of standard forming operations, for instance granulation or compacting.

A subject of the invention is also the precipitated silicas (directly) obtained via the processes described above.

The invention claimed is:

1. A process for the preparation of precipitated silica, comprising at least one of the reaction schemes (R) or (R') below:

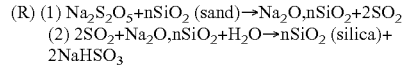

or

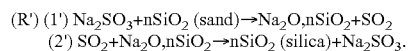

2. The process as defined by claim 1 (R), wherein scheme (3) comprises recycling said $2NaHSO_3$ to said stage (1).

3. The process as defined by claim 1, wherein the reaction scheme (R'), the sodium sulfite obtained in reaction (2') comprises starting material in reaction (1').

4. A process for preparing precipitated silica from sand and sodium metabisulfite, comprising the following steps:

a) mixing sand and sodium metabisulfite together, optionally in the following mass proportions: 40% to 60% of sand, and 60% to 40% of sodium metabisulfite;

b) heating the mixture obtained to a temperature ranging from 1,200° C. to 1,600° C. to produce solid sodium silicate and sulfur dioxide $SO_2$;

c) then dissolving said sodium silicate in water, optionally in a weight proportion of 10% to 40% of silicate per 90% to 60% of water, to obtain, optionally after filtration, an aqueous sodium silicate solution;

d) reacting the sulfur dioxide $SO_2$ with said aqueous sodium silicate solution, optionally in the additional presence of water, the reaction optionally being performed at a temperature ranging from 60° C. to 100° C., and for 15 to 180 minutes, to obtain a mixture containing precipitated silica and sodium hydrogen sulfite; and e) separating the precipitated silica from the sodium hydrogen sulfite, optionally by filtration.

5. The process as defined by claim 4, wherein, in step e), the mixture obtained in step d) is subjected to filtration, and:

the resulting filter cake is, optionally after acidification, washed and dried, to obtain a precipitated silica; and optionally, the filtrate, containing the sodium hydrogen sulfite, is dried, to obtain sodium metabisulfite, which is recycled into step a).

6. A process for preparing precipitated silica from sand and sodium sulfite, comprising the following steps:

a) mixing sand and sodium sulfite together, optionally in the following mass proportions: 50% to 70% of sand to 50% to 30% by weight of sodium sulfite;

b) heating the mixture obtained to a temperature ranging from 1,200° C. to 1,600° C. to produce solid sodium silicate and sulfur dioxide $SO_2$;

c) dissolving said sodium silicate then in water, in a weight proportion of 10% to 40% of silicate per 90% to 60% to provide, optionally after filtration, an aqueous sodium silicate solution;

d) reacting the sulfur dioxide $SO_2$ obtained in step b) with said aqueous sodium silicate solution, optionally in the additional presence of water, the reaction optionally being performed at a temperature ranging from 60° C. and 100° C., and for 15 to 180 minutes, to obtain a mixture containing precipitated silica and sodium sulfite; and e) separating the precipitated silica from the sodium sulfite, optionally by filtration.

7. The process as defined by claim 6, wherein in step e), the mixture obtained in step d) is subjected to filtration, and:

the resulting filter cake is, optionally after acidification, washed and dried, to provide a precipitated silica; and the filtrate, containing the sodium sulfite, is, optionally, after drying, recycled into step a).

8. The process as defined by claim 6, wherein the reaction of step d) is stopped when the pH attains a value of 8.0 to 8.2.

9. A precipitated silica prepared by a process as defined by claim 1.

10. A precipitated silica prepared by a process as defined by claim 1, comprising spherical beads thereof.

11. A precipitated silica prepared by a process as defined by claim 1, comprising a powder thereof.

12. A precipitated powder as defined by claim 11, aggregated into granules thereof.

\* \* \* \* \*